(12) United States Patent
Tsirkin et al.

(10) Patent No.: US 10,713,081 B2
(45) Date of Patent: Jul. 14, 2020

(54) SECURE AND EFFICIENT MEMORY SHARING FOR GUESTS

(71) Applicant: Red Hat, Inc., Raleigh, NC (US)

(72) Inventors: Michael Tsirkin, Westford, MA (US); Stefan Hajnoczi, St. Neots (GB)

(73) Assignee: RED HAT, INC., Raleigh, NC (US)

(*) Notice: Subject to any disclaimer, the term of this patent is extended or adjusted under 35 U.S.C. 154(b) by 0 days.

(21) Appl. No.: 16/117,889

(22) Filed: Aug. 30, 2018

(65) Prior Publication Data
US 2020/0073691 A1 Mar. 5, 2020

(51) Int. Cl.
*G06F 9/455* (2018.01)
*H04L 29/06* (2006.01)
*G06F 21/62* (2013.01)

(52) U.S. Cl.
CPC .......... *G06F 9/45558* (2013.01); *G06F 21/62* (2013.01); *H04L 63/0227* (2013.01); *H04L 63/101* (2013.01); *H04L 63/105* (2013.01); *H04L 63/20* (2013.01); *G06F 2009/45583* (2013.01); *G06F 2221/21* (2013.01)

(58) Field of Classification Search
CPC ......................... G06F 9/45558; G06F 12/1009
See application file for complete search history.

(56) References Cited

U.S. PATENT DOCUMENTS

| | | | |
|---|---|---|---|
| 6,128,713 A * | 10/2000 | Eisler | G06F 9/5016 711/134 |
| 8,239,620 B2 | 8/2012 | Hakewill | |
| 8,832,352 B2 | 9/2014 | Tsirkin et al. | |
| 9,336,038 B2 | 5/2016 | Kslot et al. | |
| 9,390,028 B2 | 7/2016 | Gordon et al. | |
| 9,552,233 B1 * | 1/2017 | Tsirkin | G06F 9/5027 |
| 9,880,871 B2 | 1/2018 | Tsirkin et al. | |
| 2009/0292899 A1 * | 11/2009 | Mansell | G06F 12/1009 711/207 |
| 2011/0225389 A1 * | 9/2011 | Grisenthwaite | G06F 12/1009 711/206 |

(Continued)

OTHER PUBLICATIONS

Do-It-Yourself Virtial Memory Translation by Alam et al.; https://yoav.net.technion.ac.il/files/2017/07/DVMT.pdf; ISCA Jun. 24-28, 2017, Toronto, ON, Canada; retrieved Jul. 10, 2018 (12 pages).

(Continued)

*Primary Examiner* — Ryan Bertram
*Assistant Examiner* — Trang K Ta
(74) *Attorney, Agent, or Firm* — K&L Gates LLP

(57) ABSTRACT

Secure and efficient memory sharing for guests is disclosed. For example, a host has a host memory storing first and second guests whose memory access is managed by a hypervisor. A request to map an IOVA of the first guest to the second guest is received, where the IOVA is mapped to a GPA of the first guest, which is is mapped to an HPA of the host memory. The HPA is mapped to a second GPA of the second guest, where the hypervisor controls access permissions of the HPA. The second GPA is mapped in a second page table of the second guest to a GVA of the second guest, where a supervisor of the second guest controls access permissions of the second GPA. The hypervisor enables a program executing on the second guest to access contents of the HPA based on the access permissions of the HPA.

17 Claims, 5 Drawing Sheets

(56) References Cited

U.S. PATENT DOCUMENTS

| | | | |
|---|---|---|---|
| 2012/0017029 A1* | 1/2012 | Santos | G06F 12/1081 |
| | | | 711/6 |
| 2012/0072619 A1* | 3/2012 | Tsirkin | G06F 9/45558 |
| | | | 710/26 |
| 2017/0031810 A1* | 2/2017 | Bonzini | G06F 12/023 |
| 2017/0123996 A1 | 5/2017 | Kishan et al. | |
| 2017/0147376 A1* | 5/2017 | Tsirkin | G06F 9/45558 |

OTHER PUBLICATIONS

Understanding Memory Resource Management in VMware vSphere; Performance Study; Technical White Paper; vmware; https://www.vmware.com/content/dam/digitalmarketing/vmware/en/pdf/techpaper/vmware-understanding-memory-resource-management-in-vsphere5.pdf; retrieved Jul. 10, 2018 (29 pages).

Design of Vhost-pci-designing a new virtio device for inter-VM communication by Wei Wang et al; Intel; www.linux-kvm.org/images/5/55/02x07A-Wei_Wang-Design_of_Vhost-pci.pdf; retrieved Aug. 28, 2018; (21 pages).

\* cited by examiner

SECURE AND EFFICIENT MEMORY SHARING FOR GUESTS

BACKGROUND

The present disclosure generally relates to virtualized computer systems. For scalability and efficiency reasons, many computer systems employ virtualized guests such as virtual machines and containers to execute computing tasks performed by the computing systems, such as for hosting application programs. Typically, guests such as containers and virtual machines may be launched to provide extra compute capacity of a type that the guest is designed to provide, while isolating compute resources used by different users and tenants away from those of other users. Guests enable a programmer to quickly scale the deployment of applications to the volume of traffic requesting the applications, and they may be deployed in a variety of hardware environments. Multiple guests may also be clustered together to perform more complex functions than the respective guests are capable of performing individually. To interact with a broader set of users and a broader computing ecosystem, guests typically employ virtualized devices such as input/output ("I/O") devices controlled by drivers, including virtualized network interfaces.

SUMMARY

The present disclosure provides a new and innovative system, methods and apparatus for secure and efficient memory sharing for guests. In an example, a host has a host memory storing first and second guests. A hypervisor executes on a processor of the host managing memory access for the first and second guests by: receiving a request to map a first input/output virtual address (IOVA) of the first guest to the second guest, where the first IOVA is mapped to a first guest physical address (GPA) of the first guest in a first page table of the first guest, and the first GPA is mapped to a first host physical address (HPA) of the host memory. The first HPA is exposed to the second guest by mapping the first HPA to a second GPA of the second guest, where the hypervisor controls access permissions of the first HPA. The second GPA is mapped in a second page table of the second guest to a first guest virtual address (GVA) of the second guest, where a supervisor of the second guest controls access permissions of the second GPA. The hypervisor enables a program executing on the second guest to access contents of the first HPA based on the access permissions of the first HPA.

Additional features and advantages of the disclosed method and apparatus are described in, and will be apparent from, the following Detailed Description and the Figures.

DETAILED DESCRIPTION OF EXAMPLE EMBODIMENTS

Figure 1:
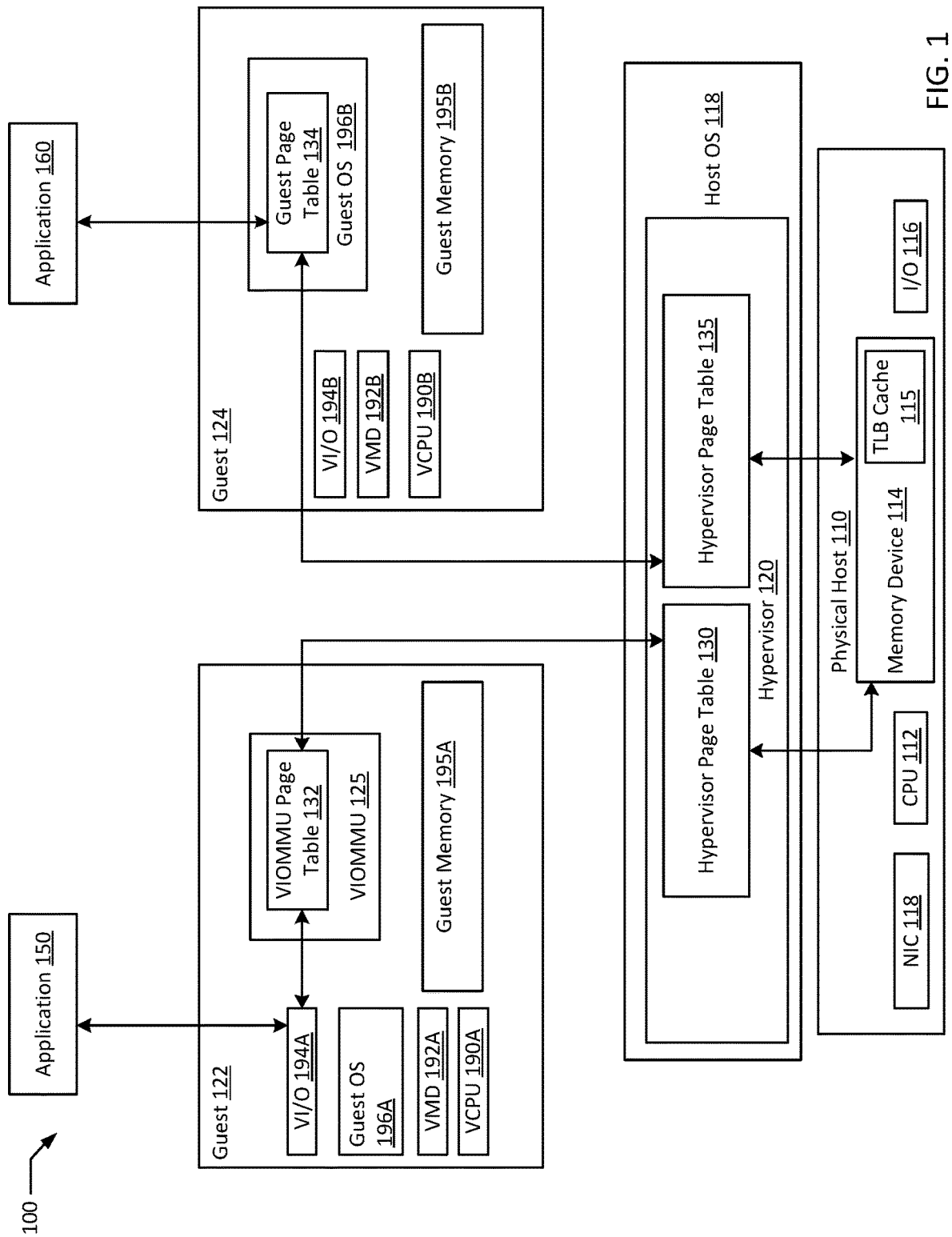
FIG. 1 is a block diagram of a system implementing secure and efficient memory sharing for guests according to an example of the present disclosure.

In many computer systems, physical hardware may host guests such as virtual machines and/or containers. In an example, a virtual machine ("VM") may be a robust simulation of an actual physical computer system utilizing a hypervisor to allocate physical resources to the virtual machine. In sharing physical computing resources, guests and/or a hypervisor controlling them, may also have access to shared components of the underlying host, for example, I/O devices (e.g., network interface cards ("NICs"), storage controllers, USB controllers, PS2 interfaces, etc.). However, such access is typically restricted through a virtualization manager such as a hypervisor to ensure that virtual environments remain segregated and to prevent unauthorized access to other virtual environments on the same host, or to the host itself. In many cases, direct access to physical hardware, including physical I/O devices and memory, may be configured to require elevated access to prevent security risks from giving guest userspace components (e.g., applications executing without elevated rights) access to these physical components. For example, with rights to directly manipulate memory, a malicious user with limited user access to a system may be able to read the data of other accounts and/or execute destructive or other malicious code.

In typical computer systems, there may be more data referenced by executing applications (both applications executing on physical hardware and those in virtualized guests on the physical hardware) than there is memory available on the system. Typically, memory virtualization is implemented to allow memory to be shared among these various processes. For example, data may be loaded to memory when it is needed for a program to execute, and then moved to slower storage such as hard disk when the data is not being accessed. In an example, memory paging is implemented to track the virtual addresses of the data of executing applications. A given memory address may be referenced by any number of virtual addresses. Page tables that perform lookups to translate between virtual and memory addresses may be implemented with granular access controls, such that a given execution context may access only those memory locations that it has permission to access based on those memory locations being available for translation in a corresponding page table.

It is often advantageous from a latency perspective to allow different guests on the same system to share data through sharing memory access between the guests. For example, a host memory address may be mapped to two separate guests allowing both guests access to the data stored in the host memory address location. However, such access may present potential security risks, as isolating guests' memory access is often a key feature of allowing virtualized guests to operate as independent computing systems on the same hardware node. Therefore, even though memory sharing may be advantageous from a processing latency perspective, implementation in a secure manner may be more challenging than communication via a networking protocol. In a typical memory sharing implementation, a supervisor (e.g., kernel) of a source guest may typically require a degree of control over guest physical addresses (GPAs) of a destination guest in order to manage memory access to the memory addresses where the source guest has stored data. A supervisor of the destination guest may then map these GPAs to guest virtual addresses (GVAs) in the destination guest to allow programs in the destination guest to this data. Shared memory access by guests hosted on the same system is typically provided by a hypervisor managing memory access for both the source and destination guests. However, in such an implementation, the source guest's kernel has elevated access to the destination guest's memory mappings creating a potential security risk. This also means that the source guest's supervisor would typically have a degree of control over the hypervisor's actions, including control over certain hypervisor page table entries, which is an additional security risk. In addition, each page of memory managed in this way would typically require a corresponding page of equal size in a hypervisor page table in order for translation of memory addresses to function correctly, for example, due to the source guest's supervisor exercising control over hypervisor and/or destination guest memory pages. Requiring hypervisor memory pages to be the same small size as guest memory pages may result in hypervisor page tables that need to be implemented as multiply nested page tables of four or more layers due to the vast amounts of memory addresses available to hypervisors in modern systems. These nested page tables need to be resolved for each memory access that occurs on the hypervisor's host system that is not currently cached in a CPU cache (e.g., a translation lookaside buffer or TLB cache). As a result, memory access rates for every guest on the host system become impacted by larger and deeper hypervisor page tables. In addition, since hypervisor page tables need to always be accessible, they are typically unable to be swapped into slower memory, resulting in a large, permanent presence in fast memory (e.g., DRAM, persistent memory, etc.). As more guests are launched on a given host, each guest's associated hypervisor page tables then become an ever increasing drain on the host's system resources, especially dynamic memory and translation cache resources.

The present disclosure provides for memory sharing between guests while limiting the rights given to a source guest's supervisor, and also reducing page table sizes for hypervisors, thereby improving both system security as well as average system memory access rates. In an example, a source guest stores data in a virtual address of the source guest, mapped to a GPA of the source guest, which is mapped to a host physical address (HPA) of the host of the source guest. The source guest's hypervisor makes this HPA available to the destination guest as a GPA of the destination guest, and the destination guest maps the corresponding GPA to a GVA of the destination guest associated with an application of the destination guest that processes the data in the shared memory address as an input. In an example, source and destination guest supervisors would be responsible for determining if a given process has permissions to read, write, or execute against a given virtual address on the respective guest, as well as access to the respectively associated GPAs, while the hypervisor would be responsible for managing permissions on a hypervisor page level. This clearly delineates the supervisory roles and permissions of each respective component and limits the controls each elevated rights component (e.g., guest supervisor and hypervisor) has over the others. In such examples, the hypervisor page table may also be implemented with different sized pages than the guest page tables due to the separation of permissioning authority. In an example, instead of small page sizes being implemented at a hypervisor level, hypervisor page tables may use very large pages that each hold many guest pages, which would then be located via a given offset within the hypervisor level pages, which may be shared on both the source and the destination guest. For example, a guest page table managed by a guest operating system may be implemented with 4 KB pages, while the hypervisor may be implemented with 2 MB or 4 MB or even larger pages divided by the source and destination guests into small (e.g., 4 KB) pages each starting at an offset from the beginning of the large hypervisor page the respective smaller guest pages are located in. This results a hypervisor page table with less layers (e.g., only one layer), which may also result in more cache hits when translating pages on the hypervisor level (due to less total pages in the hypervisor's address space). By minimizing the layers of hypervisor page tables, each hypervisor translation lookup is executed faster since the processor avoids performing multiple nested lookups to reach a final translation result. Therefore the hypervisor level address translations for every guest on the system are sped up, resulting in less cross guest memory management overhead, speeding up memory access for all guests on a host. As long as source and guest supervisors may be trusted as secure or at least relatively secure, having a hypervisor only manage access permissions on a larger page instead of at finer small page granularities would typically be a very limited security penalty, that may typically be offset by the reduced security role of the source guest supervisor in memory management. Because in most cases, guest application accounts are the primary vectors for exploits, giving destination guest supervisors a larger role in managing memory security may typically be a worthwhile tradeoff for enhanced memory and data access efficiency. Therefore, secure and efficient memory sharing for guests provides faster and more efficient memory management and data sharing between guests while being at least similarly secure as compared with other memory sharing techniques between guests.

FIG. 1 is a block diagram of a system implementing secure and efficient memory sharing for guests according to an example of the present disclosure. The system 100 may include one or more physical host(s) 110. Physical host 110 may in turn include one or more physical processor(s) (e.g., CPU 112) communicatively coupled to memory device(s) (e.g., MD 114) and input/output device(s) (e.g., I/O 116). As used herein, physical processor or processors 112 refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory device 114 refers to volatile or non-volatile memory devices, such as RAM, ROM, EEPROM, or any other device capable of storing data. As discussed herein, I/O device(s) 116 refer to devices capable of providing an interface between one or more processor pins and an external device, the operation of which is based on the processor inputting and/or outputting binary data. For example, a network interface card (e.g., NIC 118) may be an example of an I/O device through which physical host 110 and guests 122 and/or 124 hosted on physical host 110 communicates with external systems over a network. CPU(s) 112 may be interconnected using a variety of techniques, ranging from a point-to-point processor interconnect, to a system area network, such as an Ethernet-based network. Local connections within physical host 110, including the connections between processor 112 and a memory device 114 and between processor 112 and I/O device 116 may be provided by one or more local buses of suitable architecture, for example, peripheral component interconnect (PCI).

In an example, physical host 110 may host one or more guests, for example, guest 122 and 124. In an example guests may be VMs and/or containers, which may host additional nested layers of guests. For example applications 150 and/or 160 may be another virtual guest nested inside of guest 122 or 124. In an example, a container as referred to herein may be implemented with any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, guest 122 may be a VM executing on physical host 110. In an example, a container may execute on VM 122. In addition, containers and/or VMs may further host other guests necessary to execute their configured roles (e.g., a nested hypervisor or nested containers). For example, a VM (e.g., guest 122) and/or a container may further host a Java® Virtual Machine ("JVM") if execution of Java® code is necessary.

System 100 may run one or more VMs (e.g., guest 122), by executing a software layer (e.g., hypervisor 120) above the hardware and below the guest 122, as schematically shown in FIG. 1. In an example, the hypervisor 120 may be a component of respective host operating system 118 executed on physical host 110. In another example, the hypervisor 120 may be provided by an application running on host operating system 118. In an example, hypervisor 120 may run directly on physical host 110 without an operating system beneath hypervisor 120. Hypervisor 120 may virtualize the physical layer, including processors, memory, and I/O devices, and present this virtualization to guest 122 as devices, including virtual central processing unit ("VCPU") 190A, virtual memory devices ("VMD") 192A, virtual input/output ("VI/O") device 194A, and/or guest memory 195A. In an example, an IO memory management unit ("IOMMU") may manage memory access to system memory from an I/O device. In an example, VI/O 194A may be a virtual device whose memory space is managed by a virtual IOMMU 125 via one or more VIOMMU page tables (e.g., VIOMMU page table 132). In an example, VIOMMU page table 132 and/or VIOMMU 125 may be managed by a guest supervisor of guest 122 (e.g., guest OS 196A), for example, through a driver. In an example, VI/O 194A may be a virtual network interface through which guest 122 communicates with external computing resources (e.g., guest 124, physical host 110, and other hosts or guests over a network). In an example, a physical I/O device (e.g., I/O 116, NIC 118) may be virtualized to provide the functionality of the physical device to a virtual guest. In an example, hypervisor 120 may host VIOMMU 125 to manage memory access for VI/O 194A. In an example, VIOMMU 125 may execute independently, as part of host OS 118, as part of hypervisor 120, or within a virtualized guest (e.g., guest 122). In an example, a guest 122 may be a virtual machine and may execute a guest operating system 196A which may utilize the underlying VCPU 190A, VMD 192A, and VI/O 194A. Processor virtualization may be implemented by the hypervisor 120 scheduling time slots on physical processors 112 such that from the guest operating system's perspective those time slots are scheduled on a virtual processor 190.

Guest 122 may run on any type of dependent, independent, compatible, and/or incompatible applications on the underlying hardware and host operating system 118. In an example, a container or application (e.g., applications 150, 160) running on guests 122 and 124 may be dependent on the underlying hardware and/or host operating system 118. In another example, a container or application (e.g., applications 150, 160) running on guests 122 and 124 may be independent of the underlying hardware and/or host operating system 118. In an example, a container or application (e.g., applications 150, 160) running on guests 122 and 124 may be compatible with the underlying hardware and/or host operating system 118. Additionally, a container or application (e.g., applications 150, 160) running on guests 122 and 124 may be incompatible with the underlying hardware and/or OS. The hypervisor 120 may manage memory for the host operating system 118 as well as memory allocated to the guests 122 and 124 and guest operating system 196A-B such as guest memory 195A-B provided to guest OS 196.

In an example, any form of suitable network for enabling communications between computing devices, for example, a public network (e.g., the Internet), a private network (e.g., a local area network (LAN) or wide area network (WAN)), or a combination thereof may be employed to connect physical host 110, guests 122 and 124, and/or to other computer systems. In an example, NIC 118 provides an interface between physical host 110 and/or guests 122 and/or 124 and a network. In various examples, an IOMMU (e.g., VIOMMU 125) may be a physical hardware component, a software component, or a combination of both hardware and software. In an example, one or more page tables (e.g., VIOMMU page table 132, hypervisor page tables 130, 135, guest page table 134) may provide translation for virtual addresses (e.g., via page table entries) to physical memory addresses in memory device 114. In the example, VIOMMU 125 and/or hypervisor 120 may provide an interface between page tables 130, 132, 134 and memory device 114. In an example, VIOMMU 125 and/or hypervisor 120 may further provide an interface between virtual memory devices (e.g., guest memory 195A-B, VMD 192A-B) and memory device 114. In an example, memory device 114 may be implemented with a translation lookaside buffer, (e.g., TLB cache 115) that stores recent translations of virtual memory addresses to physical memory addresses that is queried prior to querying a page table for a given translation. In an example, TLB cache 115 may be a physical or virtual component caching recent translation results that may be quickly accessed by CPU 112.

In an example, VI/O 194A is allocated a section of physical memory in memory device 114 by hypervisor 120 as device memory for VI/O 194A, and this section of memory is also virtualized in guest memory 195A. In the device memory, guest OS 196A, VI/O 194A, and/or a driver of VI/O 194A allocates certain memory addresses related to messages for transmission, these memory addresses being addressed via IO virtual addresses (IOVAs) translated by VIOMMU page table 132 into guest physical addresses of guest 122. In an example, hypervisor page table 130 may then be used to translate these GPAs associated with the message storage IOVAs into host physical addresses of physical host 110 in memory device 114. In an example, a source guest may also share a guest virtual address unrelated to an I/O device to a destination host, in which case the GVA of the source guest and its associated GPA would be shared by the hypervisor. In an example, hypervisor page table 135 may be another page table of hypervisor 120, associated with guest 124. In an example, guest 122 may host an application 150 that processes data, but guest 122 may be isolated away from external communications for security reasons. In the example, guest 122 may be implemented with a VI/O 194A that is configured to appear to be an external communication device to guest OS 196A, with messages sent by application 150 to VI/O 194A for external transmission. In the example, VI/O 194A may instead transfer these messages to guest 124, which may be implemented as a communication gateway (e.g., for other guests on physical host 110 including guest 122). In the example, guest 124 has direct access to control NIC 118 for external network access (e.g., through VI/O 194B). In the example, when guest 122 requests to send an external message via VI/O 194A, what happens is the message is written to a memory address shared to guest 124, which is then transmitted externally (e.g., via application 160 accessing VI/O 194B's message transmission routines). In an example, hypervisor 120 adds a memory mapping of a guest physical address of guest 124 to hypervisor page table 135 at the same host physical address as the guest physical address of guest 122 where the message for transmission is stored. In the example, this memory address is then exposed to application 160 by guest OS 196B by mapping the GPA in hypervisor page table 135 to a GVA of application 160 in guest page table 134. In an example, the GPAs in hypervisor page table 130 and 135 are implemented with a consistent offset. For example, a consistent offset enables different sized pages between hypervisor page tables 130 and 135 with VIOMMU page table 132 and/or guest page table 134. In an example, after both guest OS 196B and hypervisor 120 verify that application 160 has access to both the GPA (e.g., GPA of guest 124) and the HPA of the message from application 150, application 160 transmits the message out of NIC 118. In an example, VMD 192B, VCPU 190B, and guest memory 195B perform similar functions for guest 124 as their counterparts VMD 192A, VCPU 190A, and guest memory 195A do for guest 122.

Figure 2:
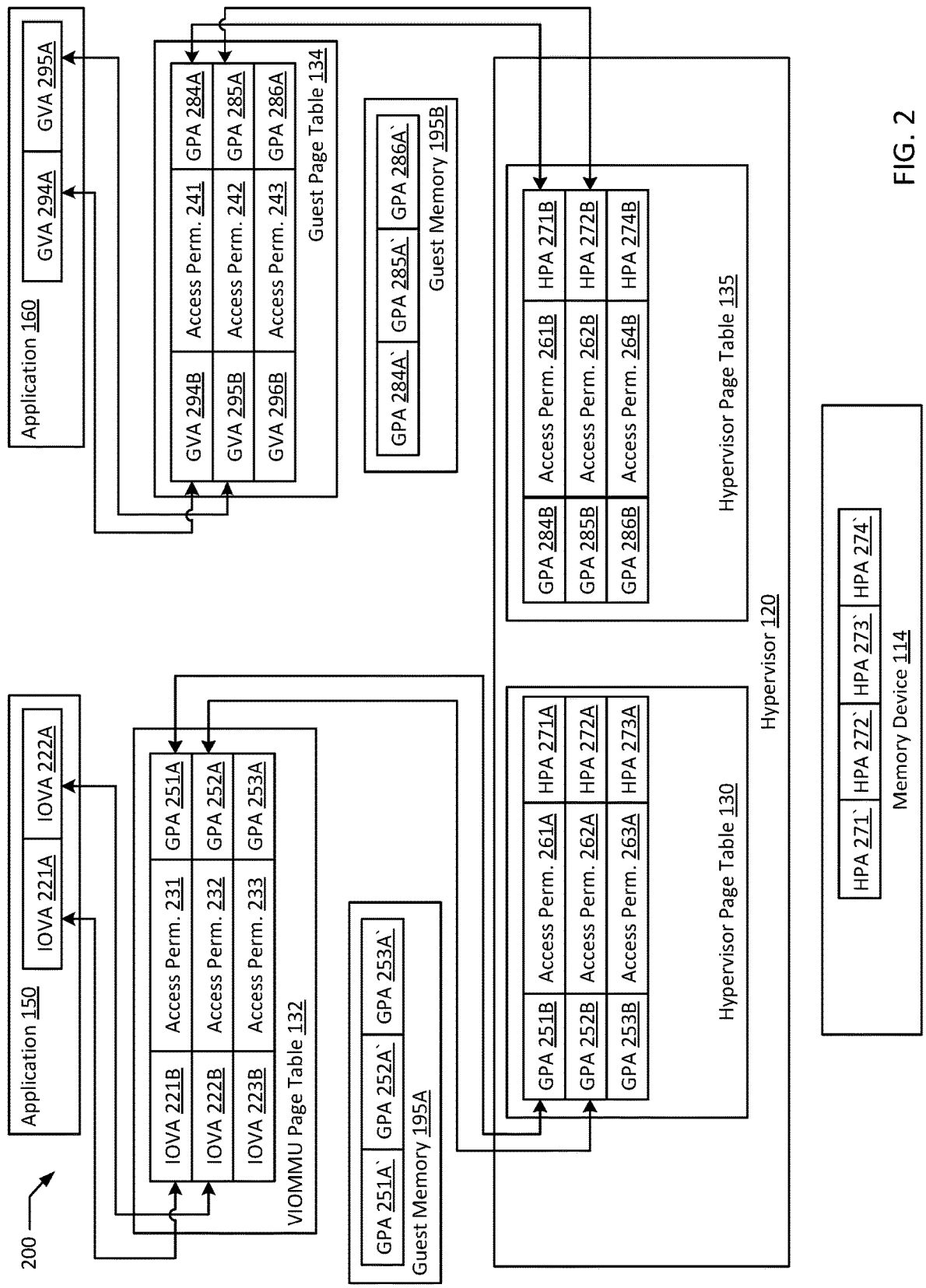
FIG. 2 is a block diagram illustrating a system implementing secure and efficient memory sharing for guests passing a message from a first guest to a second guest according to an example of the present disclosure.

FIG. 2 is a block diagram illustrating a system implementing secure and efficient memory sharing for guests passing a message from a first guest to a second guest according to an example of the present disclosure. In an example, system 200 illustrates application 150 of system 100 transmitting messages via application 160. In various examples of system 200, addresses represented with the same number and different letters are representations of the same address as they appear to different components of system 100 (e.g., guests 122, 124 vs. physical host 110). For example, IOVA 221A is IOVA 221B, IOVA 222A is IOVA 222B, GPA 251A is GPA 251B, GPA 252A is GPA2B, HPA 271A is HPA 271B, HPA 272A is HPA 272B, GPA 284A is GPA 284B, GPA 285A is GPA 285B, GPA 286A is GPA 286B, GVA 294A is GVA 294B, GVA 295A is GVA 295B, etc. In addition, addresses denoted as prime (') (e.g., GPAs 251A', 252A', 253A', 284A', 285A', 286A', HPA 271', 272', 273', 274', etc.) refer to the locations on a respective memory device (e.g., guest memories 195A-B, memory device 114) where the corresponding respective memory addresses are located. In an example, application 150 has access to input/output virtual addresses (IOVAs) of VI/O 194A. In the example, IOVAs 221A and 222A are IOVAs where application 150 stores data for transmission, which are mapped to GPAs of guest 122 in VIOMMU page table 132. In the example, VIOMMU page table 132 also includes other IOVA to GPA mappings (e.g., IOVA 223B to GPA 253A), for example, associated with other applications on guest 122. In an example, a supervisor of guest 122 (e.g., guest OS 196A), manages access permissions (e.g., access permissions 231, 232, and 233) respectively associated with each page table entry in VIOMMU page table 132 that maps an IOVA (e.g., IOVAs 221B-223B) to a GPA (e.g., GPAs 251A-253A). In the example, IOVA 221A is the same IOVA as IOVA 221B, and IOVA 222A is the same IOVA as IOVA 222B. In the example, GPAs 251A-253A are represented in the virtualized physical memory address space of guest 122 (e.g., guest memory 195A) as GPAs 251A', 252A', and 253A'.

In an example, each of GPAs 251A-253A is also associated with a host physical address (HPA) of physical host 110 in memory device 114 where the data of GPAs 251A-253A is physically stored. In an example, hypervisor 120 stores translation information for GPA (e.g., GPAs 251B-252B) to HPA (e.g., HPA 271A, 272A, 273A) in hypervisor page table 130. In some examples, hypervisor 120 may attempt to locate related GPAs of guest 122 on the same hypervisor page, for example, where hypervisor pages are larger than guest pages. For example, if a large message from application 150 spans multiple guest pages (e.g., IOVAs 221A-222A), then locating both of these guest pages on the same hypervisor page (e.g., HPA 271A and 272A) with different offsets corresponding to each of IOVA 221A and 222A enables only one hypervisor page to be looked up and retrieved (as opposed to two hypervisor pages), speeding up translation at the hypervisor level. Therefore, in various examples, HPAs 271A-273A may represent one or more different pages in host memory. Similarly, HPAs 271'-274' in memory device 114 may represent one or more pages or blocks in memory device 114 corresponding to HPAs 271A-B, 272A-B, 273A, and/or 274B. In an example, locating multiple virtual guest pages (e.g., GPAs 251B and 252B) with the same access permissions (e.g., access permissions 261A-262A) on the same host physical address may also allow hypervisor 120's permission verifications to be handled more efficiently.

In an example, after a data message from application 150 is stored to HPA 271' and/or HPA 272' (e.g., via IOVA 221A-222A translated to GPA 251A-252A and then to HPA 271A-272A), that address (e.g., HPA 271' and/or HPA 272') is also mapped to guest 124. For example, an entry corresponding to HPA 271' and/or HPA 272' is added to hypervisor page table 135 associated with guest 124 (e.g., as HPA 271B and/or HPA 272B). These entries along with corresponding GPA offsets from guest 122 are communicated to a supervisor of guest 124 (e.g., guest OS 196B). In an example, hypervisor 120 mirrors a relative location of GPA 251B from guest 122 to map GPA 284B of guest 124 to the same HPA 271A-B. In the example, guest OS 196B assigns GPA 251A-B to GVA 294A-B, setting corresponding access permissions 241 to a level authorized by guest 122. For example, access permissions 241 may be set to read only, thereby allowing application 160 to read and transmit a message but not allowing application 160 to overwrite or clear the message buffer upon transmission completion. In another example, access permissions 241 being set to read/write may allow application 160 and/or guest 124 to update HPA 271' and therefore application 150 and guest 122's memory space, for example, to flush the message buffer and clear it out after transmission is complete. In an example, a larger message may require multiple GVAs and/or GPAs, which may or may not correspond to additional different HPAs depending on whether HPAs are implemented with larger page sizes than GPAs and/or GVAs on a given system.

Figure 3:
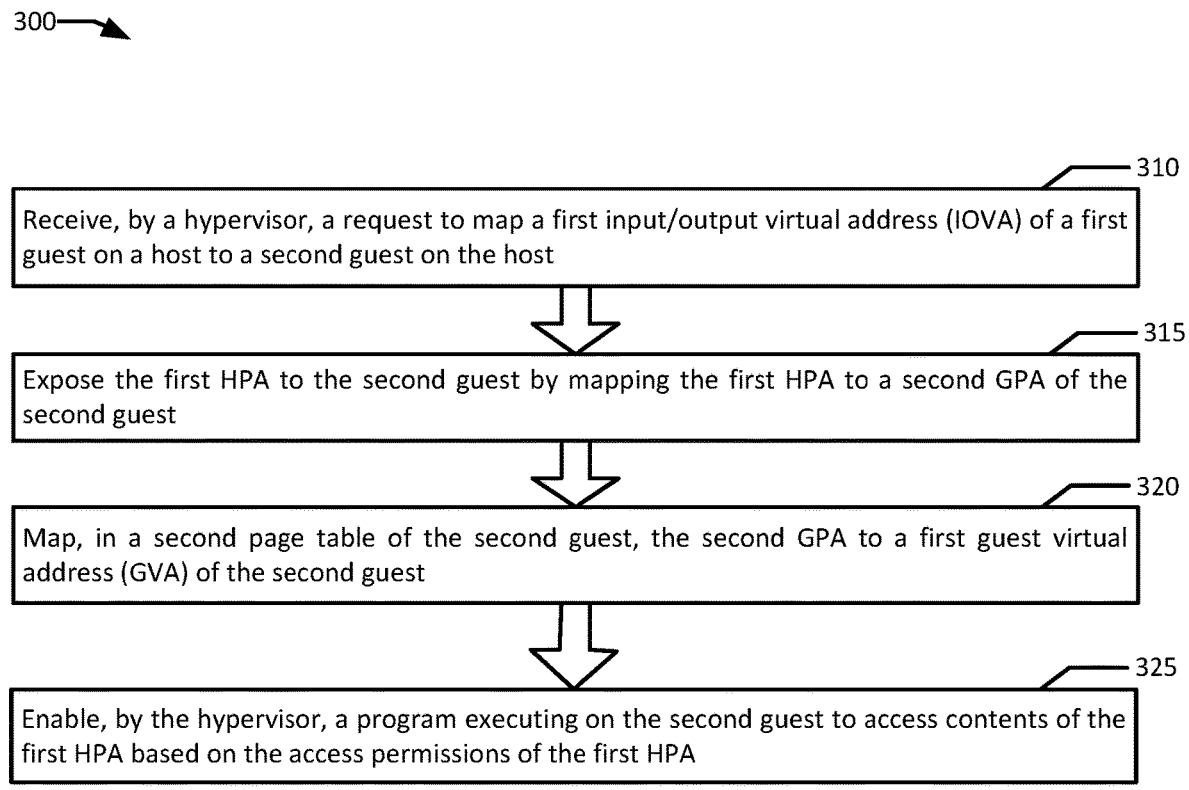
FIG. 3 is a flowchart illustrating an example of secure and efficient memory sharing for guests according to an example of the present disclosure.

FIG. 3 is a flowchart illustrating an example of secure and efficient memory sharing for guests according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by a hypervisor 120.

Example method 300 may begin with a hypervisor receiving a request to map a first input/output virtual address (IOVA) of a first guest on a host to a second guest on the host (block 310). In an example, the first IOVA is mapped to a first guest physical address (GPA) of the first guest in a first page table of the first guest, and the first GPA is mapped to a first host physical address (HPA) of the host memory. In an example, hypervisor 120 receives a request to map IOVA 221A-B from guest 122 to guest 124. In the example, IOVA 221A-B is mapped to GPA 251A-B by guest OS 196A (e.g., by a driver associated with VI/O 194A) in a VIOMMU page table 132 associated with VIOMMU 125 responsible for memory handling for VI/O 194A. In an example, an application 150 stores a message for transmission in IOVA 221A-B and GPA 251A-B. In an example, guest OS 196A and/or VIOMMU 125 requests hypervisor 120 to map IOVA 221A-B to GPA 251A-B. GPA 251A-B is also mapped to HPA 271A by hypervisor 120. In the example, data stored in HPA 271A is stored to a memory page HPA 271' on memory device 114. In some examples, GPA 251A-B may first be translated into a host virtual address (HVA) of physical host 118, and then the corresponding HVA may be translated into HPA 271A-B.

In an example, upon detecting that data is stored to HPA 271' which is assigned to a memory space of VI/O 194A, hypervisor 120 determines that a message is queued for transmission from VI/O 194A, which is interpreted as a request to map the message to guest 124 for transmission via NIC 118 accessible to guest 124. For example, guest 124 is a network bridge or a network gateway for physical host 110 that manages network traffic into and/or out of physical host 110 on NIC 118 capable of transmitting messages over a network. In the example, message transmission over NIC 118 may be initiated with a guest isolated from the network (e.g., guest 122) saving a message to IOVA 221A-B, which is then accessed by guest 124 (e.g., the network gateway), via correspondingly mapped GVA 294A-B to be transmitted. In an example, IOVA 221A-B is translated by VIOMMU page table 132, which is part of VIOMMU 125.

The first HPA is exposed to the second guest by mapping the first HPA to a second GPA of the second guest (block 315). In an example, the hypervisor controls access permissions of the first HPA. In an example, VIOMMU 125 and/or guest OS 196A may control access permissions 231 determining read, write, and/or execute access to GPA 251A-B (e.g., by application 150). In an example, hypervisor 120 may control access permissions 261A determining read, write, and/or execute access to HPA 271A-B (e.g., by application 150, VIOMMU 125, and/or guest OS 196A). In an example, hypervisor 120 maps HPA 271A-B to GPA 284A-B of guest 124, and then controls access from guest 124 (e.g., application 160, guest OS 196B) to HPA 271A-B via access permissions 261B. In an example, hypervisor page tables 130 and/or 135 are implemented with larger pages than VIOMMU page table 132 and guest page table 134. In such examples, hypervisor 120 may send an offset of GPA 251A-B and/or an offset of IOVA 221A-B from guest 122 to guest 124, for example, to allow guest 124 to mirror the memory mapping of GPA 284A-B to that of GPA 251A-B and/or the memory mapping of GVA 294A-B to that of IOVA 221A-B by sharing the same address offset (if not the same virtual page address) as the corresponding virtual address of the source guest. In an example, the hypervisor 120 selects an address for GPA 284A-B based on an address location of GPA 251A-B.

The second GPA is mapped to a first guest virtual address (GVA) of the second guest in a second page table of the second guest (block 320). In an example, a supervisor of the second guest controls access permissions of the second GPA. In an example, after GPA 284A-B is exposed to guest 124 and guest OS 196B, GPA 284A-B is mapped to GVA 294A-B in guest page table 134. For example, guest OS 196B may request hypervisor 120 to map GPA 284A-B to GVA 294A-B based, for example, on an address space of application 160. In an example, guest OS 196B controls access permissions 241, which controls read, write, and/or execute permissions to GPA 284A-B. In the example, guest OS 196B determines whether application 160 has permissions to read, write, and/or execute to GPA 284A-B when application 160 attempts to access GVA 294A-B. In an example, application 160 is a driver for VI/O 194B and/or NIC 118, which may have, for example, read/write access to GVA 294A-B, read only access to GVA 295A-B, and no access to GVA 296B. In the example, application 160 attempting to access GVA 296B may have the attempt rejected by guest OS 196B, for example, via an error.

The hypervisor enables a program executing on the second guest to access contents of the first HPA based on the access permissions of the first HPA (block 325). In an example, application 160 requests access to GVA 294A-B to retrieve the message from application 150 for transmission. The request for GVA 294A-B may be evaluated by guest OS 196B and translated as a request to access GPA 284A-B, and access to GPA 284A-B may be granted based on access permissions 241. In the example, the attempt to access GPA 284A-B may be further translated into a request to access HPA 271A-B and HPA 271' where the message is stored. As described herein, GVA 294A and 294B are the same virtual address with GVA 294A being the address referenced by application 160 and GVA 294A being the same address as referenced in guest page table 134. Similarly, GPA 284A is a reference in guest page table 134 while GPA 284B is a reference in hypervisor page table 135, both GPA 284A and 284B referencing the same guest physical address (e.g., GPA 284A'). In the example, HPAs 271A and 271B both address a host memory address at HPA 271'. In an example, hypervisor 120 evaluates access permissions 261B to determine whether access should be granted to HPA 271B based on the request to access GPA 284A-B. In some examples, rather than evaluating whether application 160 may access HPA 271B, hypervisor 120 may instead evaluate whether guest OS 196B may access HPA 271B, leaving the initial gatekeeping on the application level to guest OS 196B. In such implementations, hypervisor page table 135's access permissions may be less granular and therefore less capacity intensive than a hypervisor page table responsible for guest user level memory access permissioning. In many examples guest OS 196B may be trusted as secure since exploits allowing a user of a guest (e.g., application 160) to gain unauthorized administrator access (e.g., as the kernel of guest OS 196B) may typically be caught and remediated quickly by security patching. In an example, application 160 is authorized to retrieve and send the message from application 150.

In an example, after a period of disuse, for example, where guest 122 is not transmitting messages, VIOMMU page table 132 is swapped into slower memory (e.g., solid state drive or hard drive storage) to clear room in memory device 114 for uses requiring faster memory access. In a counter example, hypervisor page table 130 may be incapable of being swapped out of memory device 114.

Figure 4:
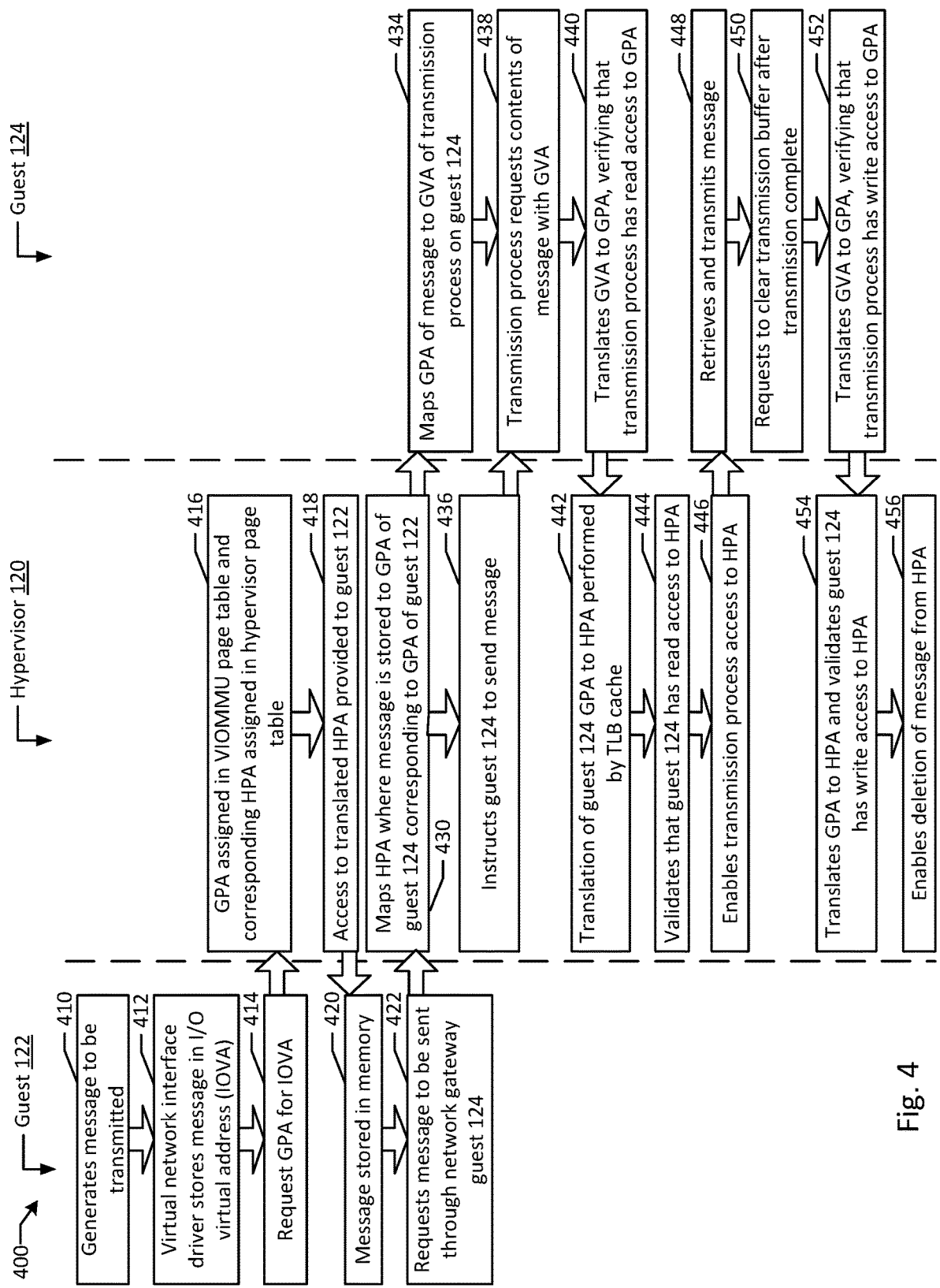
FIG. 4 is flow diagram of an example of secure and efficient memory sharing for guests according to an example of the present disclosure.

FIG. 4 is flow diagram of an example of secure and efficient memory sharing for guests according to an example of the present disclosure. Although the examples below are described with reference to the flowchart illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, hypervisor 120, facilitates data transfer from guest 122 to guest 124.

In example system 400, guest 122 generates a message to be transmitted (e.g., via application 150) (block 410). In the example, application 150 submits the message for transmission via guest OS 196A of guest 122, (e.g., via a virtual network interface driver of VI/O 194A). The virtual network interface driver then stores the message to an IOVA 221A-B via VIOMMU 125 (block 412). In an example, VIOMMU 125 and/or guest OS 196A requests hypervisor 120 to map IOVA 221A-B to a GPA (block 414). In the example, hypervisor 120 maps IOVA 221A-B to GPA 251A-B in VIOMMU page table 132, and also maps GPA 251A-B to HPA 271A (block 416). In an example, application 150 and/or guest OS 196B is unaware that guest 122 is virtualized. For example, a driver of VI/O 194A may be configured such that application 150 and/or guest OS 196B interprets storing a message to IOVA 221A-B as queuing the message directly for external transmission. In the example, hypervisor 120 provides access to HPA 271A and therefore HPA 271' to guest 122, including setting access permissions 261A to allow read/write access (block 418). In the example, application 150 successfully stores the message to HPA 271' (block 420). In an example, by storing the message to HPA 271', application 150 and/or guest OS 196A requests the message to be sent through network gateway guest 124, which has access to NIC 118 (block 422). In an example, storing the message in HPA 271' causes hypervisor 120 receive a request to map HPA 271' to guest 124. For example, an update to the contents of HPA 271' is interpreted as a request to share HPA 271' to guest 124 by hypervisor 120.

In an example, hypervisor 120 maps HPA 271' where the message is stored to GPA 284A-B of guest 124 which is selected to share a corresponding address offset within the memory page of HPA 271A-B with GPA 251A-B (block 430). In an example, hypervisor 120 sets access permissions 261B to allow guest 124 and/or guest OS 196B access to at least read the contents located at HPA 271A-B (e.g., the contents of HPA 271'). In the example, guest 124 (e.g., a kernel of guest OS 196B) maps GPA 284A-B of the message to an address space of application 160 (e.g., an external transmission process) on guest 124 (block 434). In another example, guest OS 196B requests hypervisor 120 to perform the mapping of GPA 284A-B to GVA 294A-B associated with application 160. In either example, guest OS 196B sets access permissions 241 to allow application 160 at least read rights to GPA 284A-B. In an example, hypervisor 120 additionally instructs guest 124 to send the message (block 436). In some examples, hypervisor 120 forwards a message transmission instruction, for example, from the driver of VI/O 194A. In other examples, hypervisor 120 instructs guest 124 to transmit the message based on interpreting the writing of the message to HPA 271' as a transmission request. In an example, after GPA 284A-B is mapped to GVA 294A-B, and application 160 receives the transmission request, application 160 requests the contents of the message using GVA 294A (block 438). In the example, guest OS 196B translates GVA 294A to GPA 284A-B, and verifies that application 160 has read access to GPA 284A-B (block 440).

In an example, since HPA 271A-B was recently accessed, both by guest 122 storing the message and by hypervisor 120 mapping HPA 271A-B to guest 124, translation of virtual addresses (e.g., GPAs 284A-B and/or 251A-B) is cached in TLB cache 115. In the example, TLB cache 115 allows hypervisor 120 to quickly translate GPA 284A-B to HPA 271B (block 442). In the example, hypervisor 120 verifies that guest 124 and/or guest OS 196B has at least read access to HPA 271B via evaluating access permissions 261B (block 444). In the example, hypervisor 120 enables application 160 (via guest OS 196B) to access HPA 271B (block 446). In an example, hypervisor 120 trusts that the translation request for GPA 284A-B to HPA 271B is only forwarded to hypervisor 120 after guest OS 196B has already evaluated that application 160 has access to GPA 284A-B, and therefore hypervisor 120 is only concerned with whether guest OS 196B has access to HPA 271B, rather than evaluating permissions for application 160 directly. In an example, application 160 retrieves and transmits the message (block 448).

In an example, after receiving a transmission receipt that the message was successfully transmitted, application 160 requests to clear the transmission buffer (e.g., HPA 271') (block 450). In the example, application 160 again requests access to GVA 294A-B, this time for write access to delete the contents of GVA 294A-B. Guest OS 196B then translates GVA 294A-B to GPA 284A-B via guest page table 134, verifying that application 160 also has write access to GPA 284A-B (block 452). In an example, if application 150 and/or guest OS 196A requests that the transmission buffer only be cleared after the application 150 receives a confirmation of transmission, hypervisor 120 may request guest OS 196B to set access permissions 241 for read only access. In such an example, application 160's request to write to GVA 294A-B would be rejected by guest OS 196B. In an example where application 160 does have access, its request for writing to GVA 294A-B is translated by guest OS 196B into a request for write access to GPA 284A-B, which hypervisor 120 then translates as a request by guest OS 196B to write to HPA 271B, causing hypervisor 120 to evaluate whether guest OS 196B has access to write to HPA 271B via evaluating access permissions 261B (block 454). In an example, upon successfully evaluating access permissions 261B, hypervisor 120 enables application 160 to delete the message in HPA 271' addressed via HPA 271B (block 456).

Figure 5:
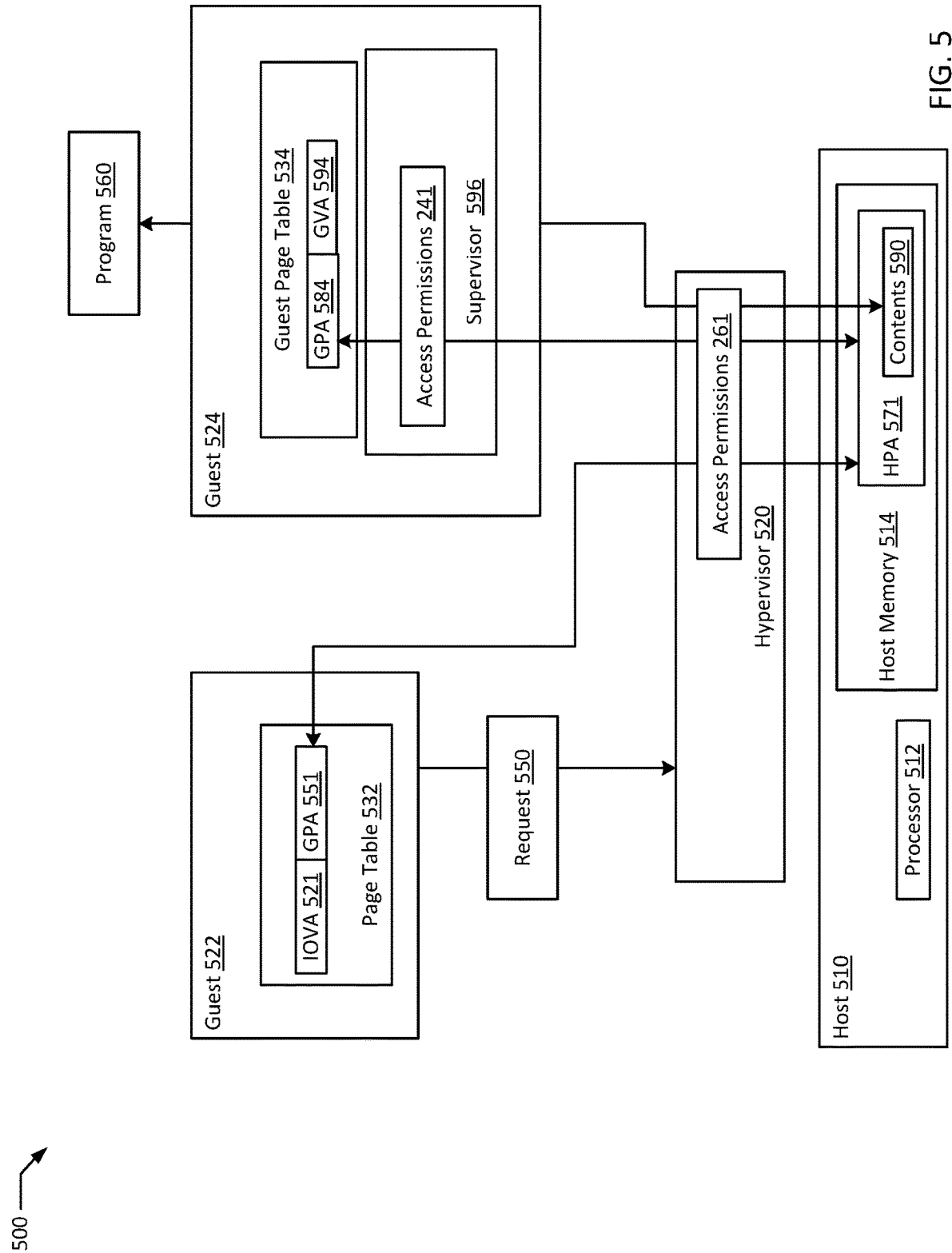
FIG. 5 is a block diagram of an example a system implementing secure and efficient memory sharing for guests according to an example of the present disclosure.

FIG. 5 is a block diagram of an example a system implementing secure and efficient memory sharing for guests according to an example of the present disclosure. Example system 500 includes host 510 with host memory 514 storing guests 522 and 524. Hypervisor 520 executing on processor 512 of host 510 manages memory access for guests 522 and 524. Hypervisor 520 receives a request 550 to map IOVA 521 of guest 522 to guest 524, where IOVA 521 is mapped to GPA 551 of guest 522 in page table 532 of guest 522, and GPA 551 is mapped to HPA 571 of host memory 514. HPA 571 is exposed to guest 524 by mapping HPA 571 to GPA 584 of guest 524, where hypervisor 120 controls access permissions 261 of HPA 571. GPA 584 is mapped to GVA 594 of guest 524 in page table 534 of guest 524, where supervisor 596 of guest 524 controls access permissions 541 of GPA 584. Hypervisor 520 enables program 560 executing on guest 524 to access contents 590 of HPA 571 based on access permissions 261.

Secure and efficient memory sharing for guests as described in the present disclosure enables fast data exchange between guests on the same host with few compromises in terms of system security, while also enabling more efficient system memory usage by reducing the size and complexity of hypervisor page tables. Data transfer via shared memory addressing is orders of magnitude faster than transmission via networking protocols, and therefore very advantageous from a latency perspective. However, typically, to share memory addresses between guests, at least one of the guests will need elevated access to control the host's hypervisor, or to control memory access of the other guest. This creates a potential security exploit defeating the isolation between guests, and potentially allowing one guest to be an avenue through which another guest may be attacked. The isolation of access rights described herein allows for memory sharing without elevated rights being granted to either source or destination guest over the other guest's memory space, in part by trusting both guests' supervisors to manage user level memory access directly. The hypervisor is then only responsible for guest supervisor level memory access to host memory resources, and therefore hypervisor page table size may be reduced. In addition, since a given guest is typically allocated large chunks of host memory, hypervisor page size may be further reduced by configuring hypervisor pages to be much larger than guest pages. With implementing such larger hypervisor memory pages, the hypervisor's memory access permissioning responsibilities may lose some granularity (e.g., allowing or denying access to more memory at a time). However, the more granular user and application level access permissioning checks may be delegated to guest supervisors, which may typically be trusted. As a result, hypervisor page table overhead incurred on hosts is reduced. Faster, more efficient data transfer is achieved between guests on the same host, while still maintaining protections against malicious users so long as guest supervisors are uncompromised. As a result of reducing hypervisor memory access overhead, host utilization may be increased, resulting in higher compute density and higher compute utilization.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a host with a host memory storing a first guest and a second guest; and
a hypervisor executing on a processor of the host and managing memory access for the first guest and the second guest by:
receiving, by the hypervisor, a request to map a first input/output virtual address (IOVA) of the first guest to the second guest, wherein the first IOVA is mapped to a first guest physical address (GPA) of the first guest in a first page table of the first guest, and the first GPA is mapped to a first host physical address (HPA) of the host memory;
exposing the first HPA to the second guest by mapping the first HPA to a second GPA of the second guest, wherein the hypervisor controls access permissions of the first HPA;
mapping, in a second page table of the second guest, the second GPA to a first guest virtual address (GVA) of the second guest, wherein a supervisor of the second guest controls access permissions of the second GPA; and
enabling, by the hypervisor, a program executing on the second guest to access contents of the first HPA based on the access permissions of the first HPA, wherein the second guest includes at least one of a network bridge and a network gateway for transmitting messages over a network, the first guest stores a message in the first IOVA, storing the message is a request to transmit the message, the second guest accesses the message stored in the first IOVA via the first GVA, and the second guest transmits the message over the network.

2. The system of claim 1, wherein a second HPA of the host memory is associated with a second IOVA of the first guest, a third GPA of the first guest, a fourth GPA of the second guest, and a second GVA of the second guest, and the hypervisor enables both the first guest and the second guest access to read contents of the second HPA.

3. The system of claim 2, wherein the hypervisor enables the first guest to modify the contents of the second HPA and rejects attempts to modify the contents of the second HPA by the second guest based on access permissions of the second HPA.

4. The system of claim 2, wherein the supervisor of the second guest prevents the program executing on the second guest from accessing at least one of the fourth GPA and the second GVA based on access permissions of the respective at least one of the fourth GPA and the second GVA stored in the second page table of the second guest.

5. The system of claim 1, wherein a hypervisor page table configured to translate at least one of host virtual addresses (HVAs) of the host and GPAs of guests executing on the host is implemented with larger sized pages than the first page table of the first guest and the second page table of the second guest.

6. The system of claim 1, wherein the first page table of the first guest is swapped into a non-volatile memory of the host.

7. The system of claim 1, wherein the supervisor of the second guest translates a request to access the first GVA of the second guest into a request to access the second GPA.

8. The system of claim 1, wherein accessing the contents of the first HPA by the second guest includes at least one of reading, writing, and executing the contents of the first HPA.

9. The system of claim 1, wherein the first page table is implemented in a virtual input/output memory management unit.

10. The system of claim 1, wherein the first GPA is first translated into a first HVA that is translated into the first HPA.

11. The system of claim 1, wherein the access permissions of the first HPA are cached in a physical cache associated with the processor on the host.

12. The system of claim 1, wherein the hypervisor sends at least one of a first offset and a second offset to the second guest from the first guest, wherein the first offset is an offset of the first GPA and the second offset is an offset of the first IOVA, and
at least one of (i) the second GPA is configured to share the first offset with the first GPA, and (ii) the first GVA is configured to share the second offset with the first IOVA.

13. The system of claim 1, wherein the hypervisor selects the second GPA for mapping the first HPA based on an address location of the first GPA.

14. The system of claim 1, wherein a supervisor of the first guest maps the first IOVA to the first GPA.

15. A method comprising:
receiving, by a hypervisor, a request to map a first input/output virtual address (IOVA) of a first guest on a host to a second guest on the host, wherein the first IOVA is mapped to a first guest physical address (GPA) of the first guest in a first page table of the first guest, and the first GPA is mapped to a first host physical address (HPA) of a host memory;
exposing the first HPA to the second guest by mapping the first HPA to a second GPA of the second guest, wherein the hypervisor controls access permissions of the first HPA;
mapping, in a second page table of the second guest, the second GPA to a first guest virtual address (GVA) of the second guest, wherein a supervisor of the second guest controls access permissions of the second GPA;
enabling, by the hypervisor, a program executing on the second guest to access contents of the first HPA based on the access permissions of the first HPA, wherein the second guest includes at least one of a network bridge and a network gateway for transmitting messages over a network,
storing, by the first guest, a message in the first IOVA, wherein storing the message is a request to transmit the message;
accessing, by the second guest, the message stored in the first IOVA via the first GVA; and
transmitting, by the second guest, the message over the network.

16. The method of claim 15, further comprising:
sending, by the hypervisor, at least one of a first offset and a second offset to the second guest from the first guest, wherein the first offset is an offset of the first GPA and the second offset is an offset of the first IOVA, and at least one of (i) the second GPA is configured to share the first offset with the first GPA, and (ii) the first GVA is configured to share the second offset with the first IOVA.

17. A computer-readable non-transitory storage medium storing executable instructions, which when executed by a computer system, cause the computer system to:
receive, by a hypervisor, a request to map a first input/output virtual address (IOVA) of a first guest on a host to a second guest on the host, wherein the first IOVA is mapped to a first guest physical address (GPA) of the first guest in a first page table of the first guest, and the first GPA is mapped to a first host physical address (HPA) of the host memory;
expose the first HPA to the second guest by mapping the first HPA to a second GPA of the second guest, wherein the hypervisor controls access permissions of the first HPA;
map, in a second page table of the second guest, the second GPA to a first guest virtual address (GVA) of the second guest, wherein a supervisor of the second guest controls access permissions of the second GPA; and
enable, by the hypervisor, a program executing on the second guest to access contents of the first HPA based on the access permissions of the first HPA,
wherein the second guest includes at least one of a network bridge and a network gateway for transmitting messages over a network, the first guest stores a message in the first IOVA, storing the message is a request to transmit the message, the second guest accesses the message stored in the first IOVA via the first GVA, and the second guest transmits the message over the network.

* * * * *